US012397572B2

(12) United States Patent
Bode et al.

(10) Patent No.: US 12,397,572 B2
(45) Date of Patent: Aug. 26, 2025

(54) MULTI-COLOR HOT STAMP PRINTING SYSTEM

(71) Applicant: Illinois Tool Works Inc., Glenview, IL (US)

(72) Inventors: Kenneth Bode, Philadelphia, PA (US); Michael Colella, Southington, CT (US); Daniela Israel, Glenview, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 346 days.

(21) Appl. No.: 17/489,896

(22) Filed: Sep. 30, 2021

(65) Prior Publication Data

US 2022/0016920 A1 Jan. 20, 2022

Related U.S. Application Data

(63) Continuation-in-part of application No. PCT/US2021/037445, filed on Jun. 15, 2021.

(60) Provisional application No. 63/086,869, filed on Oct. 2, 2020, provisional application No. 63/040,834, filed on Jun. 18, 2020.

(51) Int. Cl.
*B41K 3/24* (2006.01)
*B41K 3/58* (2006.01)

(52) U.S. Cl.
CPC . *B41K 3/58* (2013.01); *B41K 3/24* (2013.01)

(58) Field of Classification Search
CPC ......... B41F 16/0046; B41K 3/24; B41K 3/58; B41M 1/14
See application file for complete search history.

(56) References Cited

U.S. PATENT DOCUMENTS 3,961,121 A 6/1976 Warsager
4,250,511 A 2/1981 Stein et al.
5,683,785 A 11/1997 Talvalkar et al.
5,985,078 A 11/1999 Suess et al.
6,152,621 A 11/2000 Langan
9,290,038 B2 3/2016 Colella
(Continued)

FOREIGN PATENT DOCUMENTS

CN 1963571 A 5/2007
CN 102214412 A 10/2011
(Continued)

OTHER PUBLICATIONS

International Preliminary Report on Patentability mailed Feb. 22, 2022 for corresponding PCT/US2021037445 (8 pages).
(Continued)

*Primary Examiner* — Christopher E Mahoney
*Assistant Examiner* — Marissa Ferguson-Samreth
(74) *Attorney, Agent, or Firm* — The Small Patent Law Group LLC; Christopher R. Carroll

(57) ABSTRACT

A method includes moving a multi-color ribbon over a target object. The multi-color ribbon has a lower layer and an upper layer of inks or pigments. The method also includes applying heat and pressure onto the multi-color ribbon to transfer the overlying layers of the inks or pigments to the target object, and removing at least a portion of the lower layer of the ink or pigment that was transferred to the target object to reveal at least a portion of the upper layer of the ink or pigment that were transferred to the target object.

22 Claims, 5 Drawing Sheets

(56) References Cited

U.S. PATENT DOCUMENTS

| | | | | |
|---|---|---|---|---|
| 11,065,910 | B2 | 7/2021 | Wei et al. | |
| 11,279,144 | B2 * | 3/2022 | Sangkaratana | B41M 7/0054 |
| 2009/0074948 | A1 * | 3/2009 | Ihara | B41M 5/0256 427/8 |
| 2019/0193388 | A1 | 6/2019 | Fisher et al. | |
| 2019/0378438 | A1 | 12/2019 | Penrose et al. | |
| 2021/0179894 | A1 | 6/2021 | Wei et al. | |

FOREIGN PATENT DOCUMENTS

| | | | | | |
|---|---|---|---|---|---|
| EP | 0537668 | A2 | | 4/1993 | |
| GB | 2199538 | A | | 7/1988 | |
| GB | 2270392 | A | | 3/1994 | |
| JP | 2003-237247 | | * | 8/2003 | |
| WO | 1999025562 | A1 | | 5/1999 | |
| WO | WO-0068015 | A2 | * | 11/2000 | B41J 15/16 |
| WO | WO-2020234386 | A1 | * | 11/2020 | A61J 1/10 |

OTHER PUBLICATIONS

International Search Report and Written Opinion mailed Sep. 20, 2021 for corresponding PCT/US2021037445 (11 pages).

International Search Report and Written Opinion mailed Feb. 22, 2022 for corresponding application PCT/US21/53068 (12 pages).

International Preliminary Report on Patentability mailed Apr. 13, 2023 for corresponding PCT/US2021/053068 (8 pages).

* cited by examiner

MULTI-COLOR HOT STAMP PRINTING SYSTEM

CROSS-REFERENCE TO RELATED APPLICATIONS

This application claims priority to U.S. Provisional Application No. 63/086,869 (filed 2 Oct. 2020), and is a continuation-in-part of International Patent Application No. PCT/US2021/037445 (filed 15 Jun. 2021), which claims priority to U.S. Patent Application No. 63/040,834 (filed 18 Jun. 2020). The entire disclosures of these applications are incorporated herein by reference.

BACKGROUND

Technical Field

The subject matter described herein relates to hot stamp printing systems.

Discussion of Art

Some known printing ribbons used in hot stamping systems provide a single color that is transferred onto an article to be printed on by a die. One problem with this technique is that only a single color may be used to print on the article. To stamp multiple different colors on the article, however, multiple different ribbons having the different colors usually must be used. This can significantly lengthen the time needed to decorate on the target object as multiple rolls of the ribbons may need to be used and same article may need to be printed upon multiple times or with multiple stampings.

BRIEF DESCRIPTION

In one embodiment, a method includes moving a multi-color ribbon over a target object. The multi-color ribbon has a lower layer and an upper layer of inks or pigments. The method also includes applying heat and pressure onto the multi-color ribbon to transfer the overlying layers of the inks or pigments to the target object, and removing at least a portion of the lower layer of the ink or pigment that was transferred to the target object to reveal at least a portion of the upper layer of the ink or pigment that were transferred to the target object.

In one embodiment, a multi-color ribbon configured for use in a hot stamp printing system is provided. The ribbon includes an elongated carrier that continuously extends from a first end to an opposite end, and multiple, differently colored inks or pigments disposed in different layers of the elongated carrier between the first end and the second end of the elongated carrier. The elongated carrier is configured to be moved across a target object with heat and pressure applied to the elongated carrier to transfer two or more of the differently layers of the differently colored inks or pigments to the target object for hot stamp printing of the two or more layers of the differently colored inks to the target object.

In one embodiment, a hot stamp printing system includes a heated die configured to strike a multi-colored ribbon having overlying layers of different color inks or pigments to transfer the layers of the different color inks or pigments to a target object, and an ablation assembly configured to generate an ablation energy toward the layers of the different color inks or pigments on the target object, remove at least a portion of an upper layer of the layers of the different color inks or pigments on the target object, and reveal an underlying layer of the layers of the different color inks or pigments on the target object.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
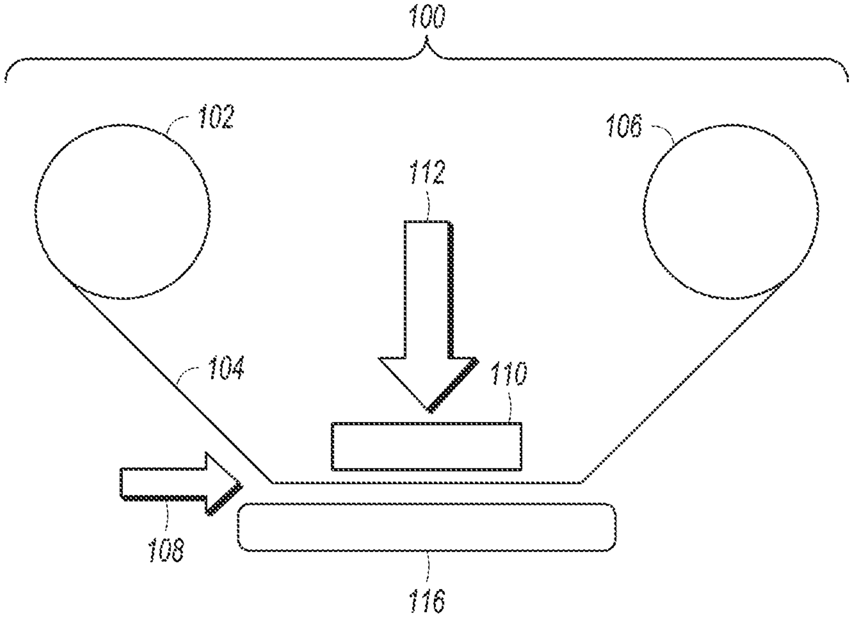
FIG. 1 schematically illustrates a hot stamp printing system.

FIG. 1 schematically illustrates a hot stamp printing system 100. The printing system 100 includes an unwind reel 102 holding a multi-color ribbon 104. The ribbon 104 extends from the unwind reel 102 to a wind-up reel 106. The ribbon 104 is unwound from the unwind reel 102 to the wind-up reel 106 along a web or ribbon direction 108. The web or ribbon direction 108 represents the direction in which the ribbon 104 moves during printing (e.g., from the unwind reel 102 to the wind-up reel 106). As the ribbon 104 moves along the web or ribbon direction 108, a heated die 110 strikes the ribbon 104 along a transfer direction 112. The pressure and heat of the die 110 transfers at least some of the coatings from the ribbon 104 to a target object 116 to be printed upon, such as an intravenous (IV) bag, a card, a document, or any of a variety of other objects. This stamping onto the target object 116 transfers the pigments or inks that are in the ribbon 104 onto the target object 116. The inks or pigments may be coatings formed from one or more polymeric binders and one or more colored pigments.

The target object 116 may be one of several target objects 116 that are successively printed on by the printing system 100. For example, several target objects 116 may move in a machine direction to successively print on the target objects 116. The machine direction in which the target objects 116 move may be the same as the web or film direction 108 or may be different from the web or film direction 108. The machine direction may be orthogonal to the web or film direction 108 (e.g., into or out of the plane of FIG. 1) or at another angle to the web or film direction 108.

In contrast to some known hot stamp ribbons that have only a single color of ink (coatings) or pigments in the ribbon, the ribbon 104 includes inks or pigments of multiple colors in different areas of the ribbon 104. Two or more of these colors can be transferred from the ribbon 104 onto the target object 116 during a single strike of the die 110.

Figure 2:
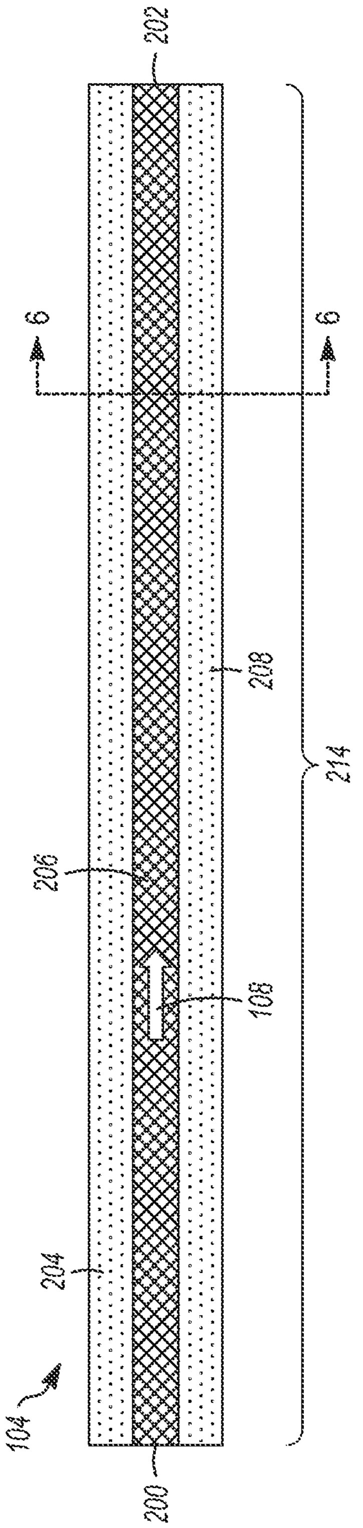
FIG. 2 illustrates one example of a hot stamp multi-color ribbon shown in FIG. 1.

FIG. 2 illustrates one example of the multi-color ribbon 104 shown in FIG. 1. As shown, the ribbon 104 is an elongated carrier 214 continuously extending from a trailing end 200 to a leading end 202. The carrier 214 also can be referred to as a film 214 or carrier film 214. The leading end 202 may be the end of the ribbon 104 that is initially coupled with the wind-up reel 106. The ribbon 104 may be pulled in the ribbon direction 108 during the printing process described above in connection with FIG. 1.

The ribbon 104 includes different areas 204, 206, 208 that hold different colored inks or pigments. In the illustrated example, the ribbon 104 includes the elongated areas 204, 206, 208 that each extend from one end 200 to the opposite end 202. These areas 204, 206, 208 are elongated in the machine direction 108 during hot stamp printing. While three areas 204, 206, 208 are shown, alternatively, the ribbon 104 may include two areas (such that the ribbon 104 holds two different colored inks or pigments) or more than three areas (such that the ribbon 104 holds three or more different colored inks or pigments).

Figure 3:
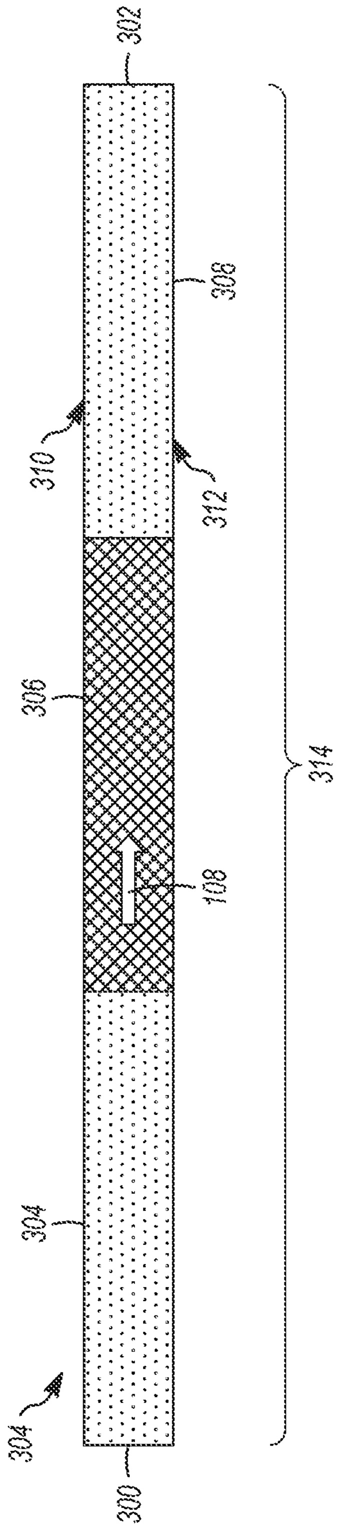
FIG. 3 illustrates another example of a hot stamp multi-color ribbon.

FIG. 3 illustrates another example of a multi-color ribbon 304. The ribbon 304 may be used in place of the ribbon 104 shown in FIGS. 1 and 2 in a hot stamp printing process. The ribbon 304 is an elongated carrier 314 continuously extending from a trailing end 300 to a leading end 302. The carrier 314 optionally can be referred to as a film 314 or carrier film 314. Similar to the ribbon 104, the leading end 302 may be the end of the ribbon 304 that is initially coupled with the wind-up reel 106. The ribbon 304 may be pulled in the machine direction 108 during the printing process described above in connection with FIG. 1.

The ribbon 304 includes different areas 304, 306, 308 that hold different colored inks or pigments. These areas 304, 306, 308 optionally can be referred to as panels. In the illustrated example, the ribbon 304 includes the elongated areas 304, 306, 308 that do not extend from one end 300 to the opposite end 302. For example, the areas 304, 306, 308 extend across the entire width of the ribbon 304 from one edge 310 of the ribbon 304 to the opposite edge 312 of the ribbon 304, with each edge 310, 312 extending from one end 300 to the other end 302. Conversely, none of the areas 204, 206, 208 in the ribbon 104 extends across the entire width of the ribbon 104 from one edge 310 to the opposite edge 312 as in the ribbon 304. Instead, the area 204 in the ribbon 104 extends from one edge partially toward (e.g., a third of the way) the opposite edge, the area 206 extends from the area 204 partially toward (e.g., another third of the way) to the opposite edge, and the area 208 extends from the area 206 to the opposite edge. While three areas 304, 306, 308 are shown, alternatively, the ribbon 304 may include two areas (such that the ribbon 304 holds two different colored inks or pigments) or more than three areas (such that the ribbon 304 holds three or more different colored inks or pigments).

Figure 4:
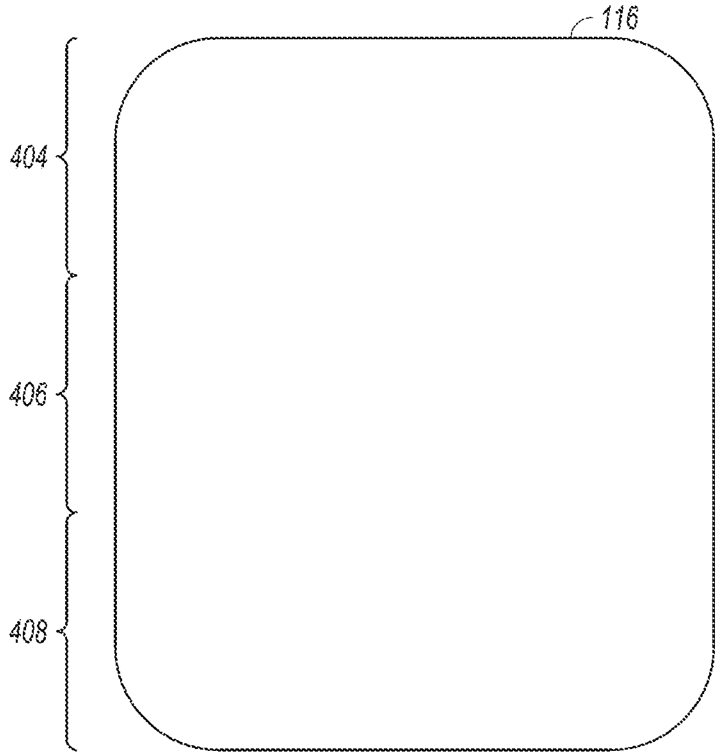
FIG. 4 schematically illustrates a top view of one example of a target object shown in FIGS. 1 and 2.

FIG. 4 schematically illustrates a top view of one example of the target object 116 shown in FIGS. 1 and 2. The visible side of the target object 116 in FIG. 4 can be the surface that is contacted by the ribbon 104 or 304 when the die 110 strikes the ribbon 104 or 304 to transfer inks or pigments from the ribbon 104 or 304.

The arrangements of the different inks in the ribbons 104, 304 can allow or prevent different colors of inks or pigments from being transferred to different areas of the target object 116. During printing with either ribbon 104, 304, a single strike of the die 110 can transfer multiple, different colored inks from the ribbon 104, 304 to the target object 116. For example, the die 110 can strike multiple areas 204, 206, and/or 208 of the ribbon 104 at the same time to simultaneously transfer different colored inks from the areas 204, 206, and/or 208 that are stricken. Because different areas 204, 206, 208 of the ribbon 104 move over different areas 404, 406, 408 of the target object 116, however, the ribbon 104 may only be able to transfer certain colors to certain areas 404, 406, 408 of the target object 116.

For example, the ribbon 104 may be able to transfer the color of the ink in the area 204 to a first area 404 of the target object 116 as the area 204 of the ribbon 104 moves over this first area 404 of the target object 116. The ribbon 104 may not transfer the ink or pigment having another color in the area 206 or 208 to the first area 404 of the target object 116 as neither the area 206 nor the area 208 of the ribbon 104 move over the first area 404 of the target object 116.

Similarly, the ribbon 104 may be able to transfer the color of the ink in the area 206 to a different, second area 406 of the target object 116 as the area 206 of the ribbon 104 moves over this second area 406 of the target object 116. The second area 406 does not overlap the first area 404 in the illustrated example. The ribbon 104 may not transfer the ink or pigment having another color in the area 204 or 208 to the second area 406 of the target object 116 as neither the area 204 nor the area 208 of the ribbon 104 move over the second area 406 of the target object 116.

The ribbon 104 may be able to transfer the color of the ink in the area 208 to a different, third area 408 of the target object 116 as the area 208 of the ribbon 104 moves over this third area 408 of the target object 116. The third area 408 does not overlap the first area 404 or the second area 406 in the illustrated example. The ribbon 104 may not transfer the ink or pigment having another color in the area 202 or 204 to the third area 408 of the target object 116 as neither the area 202 nor the area 204 of the ribbon 104 move over the third area 408 of the target object 116.

Conversely, the ribbon 304 may transfer any of the inks or pigments in any of the areas 304, 306, 308 that extend across the width of the ribbon 304 to any area of the target object 116 (that the ribbon 304 moves over during the die strike). For example, the ink or pigment in the area 304 can be transferred to any of the areas 404, 406, 408, the ink or pigment in the area 306 can be transferred to any of the areas 404, 406, 408, and the ink or pigment in the area 308 can be transferred to any of the areas 404, 406, 408 because each of the areas 304, 306, 308 extends across the entire width of the ribbon 304.

The ribbons 104, 304 may be used to change the shading or color of the ink that is transferred from any of the areas 204, 206, 208, 304, 306, 308. For example, the same die 110 may repeatedly strike the ribbon 104, 304 in one or more of the areas 204, 206, 208, 304, 306, 308 to overprint the same location on the target object 116. This overprinting can increase the amount of ink that is transferred to the target object 116. The ink that is repeatedly transferred from the ribbon 104, 304 may be from the same area 204, 206, 208, 304, 306, 308 to change the shade (e.g., darken) of the color transferred to the target object 116. With respect to the ribbon 304, the die 110 may repeatedly strike different areas 304, 306, 308 of the ribbon 304 in the same location of the target object transfer and mix multiple colors in the same location or area of the target object 116. For example, the die 110 can strike the area 304 in one location of the target object 116 and then strike the area 306 or 308 in the same location of the target object 116 to mix the color of the ink in the area 304 with the ink in the area 306 or 308 on the target object 116.

The transfer of different colored inks or pigments to different locations on the target object 116 and/or overprinting onto the target object 116 can transfer multiple, different colors from the ribbon 104, 304 to the target object 116 during a single pass of the ribbon 104, 304 over the target object 116 and/or during a single strike of the die 110 on the target object 116. For example, the ribbon 104, 304 may be unwound from the unwind reel 102 to the wind-up reel 106 a single time while transferring multiple, different colors to the target object 116 (or multiple target object 116).

The different colored inks or pigments can be transferred from the ribbon 104, 304 using different dies 110. For example, the die 110 can be changed for printing on different target objects 116 with the different dies 110 used to hot stamp print different information (e.g., different alphanumeric strings) using multiple, different colors.

Figure 5:
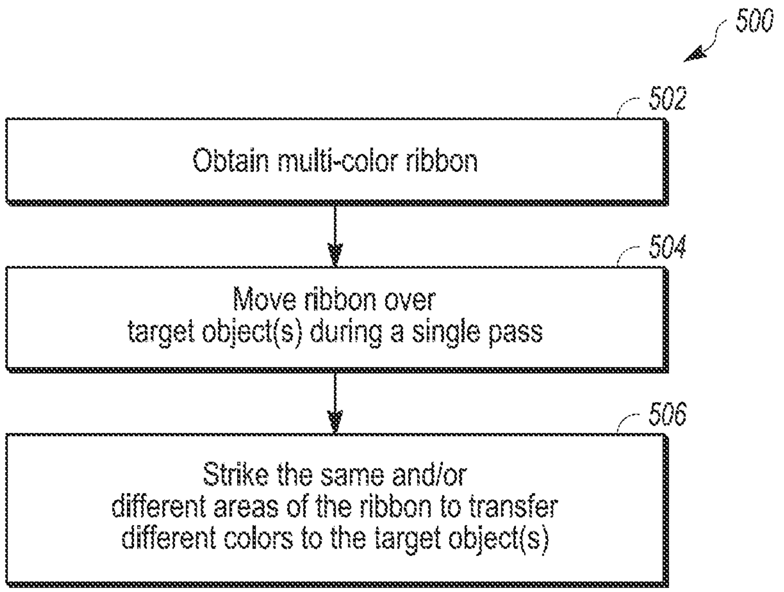
FIG. 5 illustrates a flowchart of one embodiment of a method for multi-color hot stamp printing.

FIG. 5 illustrates a flowchart of one embodiment of a method 500 for multi-color hot stamp printing. The method 500 can include operations described herein to transfer multiple, different colors in a hot stamp system using the ribbon 104, 304 (or another ribbon having different areas with different colored inks or pigments). At 502, a multi-color ribbon is obtained. As described above, this ribbon can have elongated areas having different colored inks or pigments, with the different areas extending end-to-end along the length of the ribbon. Optionally, the ribbon can have panels with different colored inks or pigments, with the different areas extending edge-to-edge along the width of the ribbon.

At 504, the ribbon is moved over one or more target objects during a single pass. For example, the ribbon may be unwound from one reel and wound onto another reel a single time while passing over one or more target objects. At 506, two or more of the different areas or panels of the ribbon are stricken by a die. This action transfers two or more different colors from the ribbon onto the target object. As a result, multiple, different colors can be printed onto each of one or more target objects during a single pass of the ribbon.

In one embodiment, a method is provided that includes moving a multi-color ribbon over a target object. The multi-color ribbon has different color inks or pigments in different areas of the multi-color ribbon. The method also includes applying heat and pressure onto the multi-color ribbon to transfer two or more of the different color inks or pigments to the target object during a single pass of the multi-color ribbon across the target object.

Optionally, the multi-color ribbon is moved across the target object in a web direction with the different areas of the multi-color ribbon being elongated along the web direction from one end of the multi-color ribbon to an opposite end of the multi-color ribbon along a length of the multi-color ribbon.

Optionally, the multi-color ribbon is moved across the target object in a web direction with the different areas of the multi-color ribbon extending from one edge of the multi-color ribbon to an opposite lateral edge of the multi-color ribbon.

Optionally, the heat and pressure are applied to transfer the two or more of the different color inks or pigments onto different locations of the target object.

Optionally, the heat and pressure are applied to change a shade of at least one of the different color inks or pigments that is transferred onto the same location of the target object multiple times during the single pass of the multi-color ribbon across the target object.

Optionally, the heat and pressure are applied to mix the two or more of the different color inks or pigments on the same location of the target object multiple times during the single pass of the multi-color ribbon across the target object.

In one embodiment, a multi-color ribbon configured for use in a hot stamp printing system is provided. The multi-color ribbon includes an elongated carrier that continuously extends from a first end to an opposite end and multiple, differently colored inks or pigments disposed in different areas of the elongated carrier between the first end and the second end of the elongated carrier. The elongated carrier is configured to be moved across a target object with heat and pressure applied to the elongated carrier to transfer two or more of the differently colored inks or pigments to the target object during a single pass of the elongated carrier across the target object for hot stamp printing of the two or more of the differently colored inks to the target object.

Optionally, the areas of the elongated carrier having the differently colored inks or pigments are elongated lanes that continuously extend from the first end to the second end of the carrier.

Optionally, the ribbon includes opposite first and second edges that each extend from the first end to the second end of the ribbon. The areas of the elongated carrier having the differently colored inks or pigments can be panels that continuously extend from the first edge to the second edge of the carrier.

Optionally, the differently colored inks are disposed in the different areas of the elongated carrier such that the two or more of the differently color inks or pigments are transferred onto different locations of the target object.

Optionally, the differently colored inks or pigments are disposed in the different areas of the elongated carrier such that the two or more of the differently colored inks are transferred onto the same location of the target object multiple times during the single pass of the multi-color ribbon across the target object.

Optionally, the differently colored inks or pigments are disposed in the different areas of the elongated carrier such that the two or more of the differently colored inks or pigments are transferred onto the same location of the target object multiple times during the single pass of the multi-color ribbon across the target object.

In one embodiment, a multi-color hot stamp ribbon is provided that includes an elongated carrier configured to be unrolled from a first reel and rolled onto a second reel of a hot stamp printing system and two or more different color inks or pigments disposed in one or more of different lanes or different panels of the carrier. The different color inks or pigments are located on the carrier such that two or more of the different color inks or pigments are transferred onto one or more of a common location or different locations of a target object that is printed on by the hot stamp printing system.

Optionally, the two or more different color inks or pigments are in the different lanes of the carrier.

Optionally, the different lanes of the carrier are elongated in directions that extend along a direction in which the carrier is unrolled from the first reel and rolled onto the second reel.

Optionally, the two or more different color inks or pigments are in the different lanes of the carrier such that the two or more different color inks or pigments are transferred onto different locations of the target object.

Optionally, the two or more different color inks or pigments are in the different panels of the carrier.

Optionally, the different panels of the carrier oriented in directions that extend perpendicular to a direction in which the carrier is unrolled from the first reel and rolled onto the second reel.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

Figure 6:
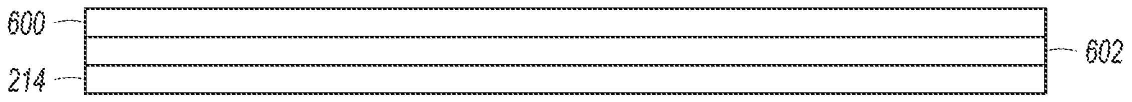
FIG. 6 illustrates a cross-sectional view of another example of a multi-color ribbon along line 6-6 shown in FIG. 2.

FIG. 6 illustrates a cross-sectional view of another example of a multi-color ribbon 104 along line 6-6 shown in FIG. 2. The ribbon 104 can include multiple layers 600, 602 of different colored ink or pigments in at least one of the areas or lanes 204, 206, 208. An upper or exposed layer 600 can be the ink or pigment that is visible along the top or exposed surface of the ribbon 104, such as the layer that is visible in FIG. 2 in the area 204, 206, or 208. A lower or covered layer 602 can be a different colored ink or pigment that is beneath the upper or exposed layer 600 and between the upper layer 600 and the elongated carrier 214. For example, the upper layer 600 may be formed from or include red, green, white, or blue ink or pigments and the lower layer 602 can be formed from or include black ink or pigments. The lower or covered layer 602 may not be visible through the upper or exposed layer 600 in one embodiment.

In one embodiment, only one of the areas 204, 206, 208 includes the different colored layers 600, 602. Alternatively, two or more of the areas 204, 206, 208 include the different colored layers 600, 602. In an embodiment where two or more of the areas 204, 206, 208 include the different colored layers 600, 602, the underlying or covered layer 602 can be the same color in the different areas 204, 206, and/or 208 or may be different colors in different areas 204, 206, 208. For example, the underlying layer 602 can be black ink or pigments beneath the red ink or pigments in the area 204 and the underlying layer 602 can be red, yellow, or white ink or pigments beneath the black ink or pigments in the area 206.

Figure 7:
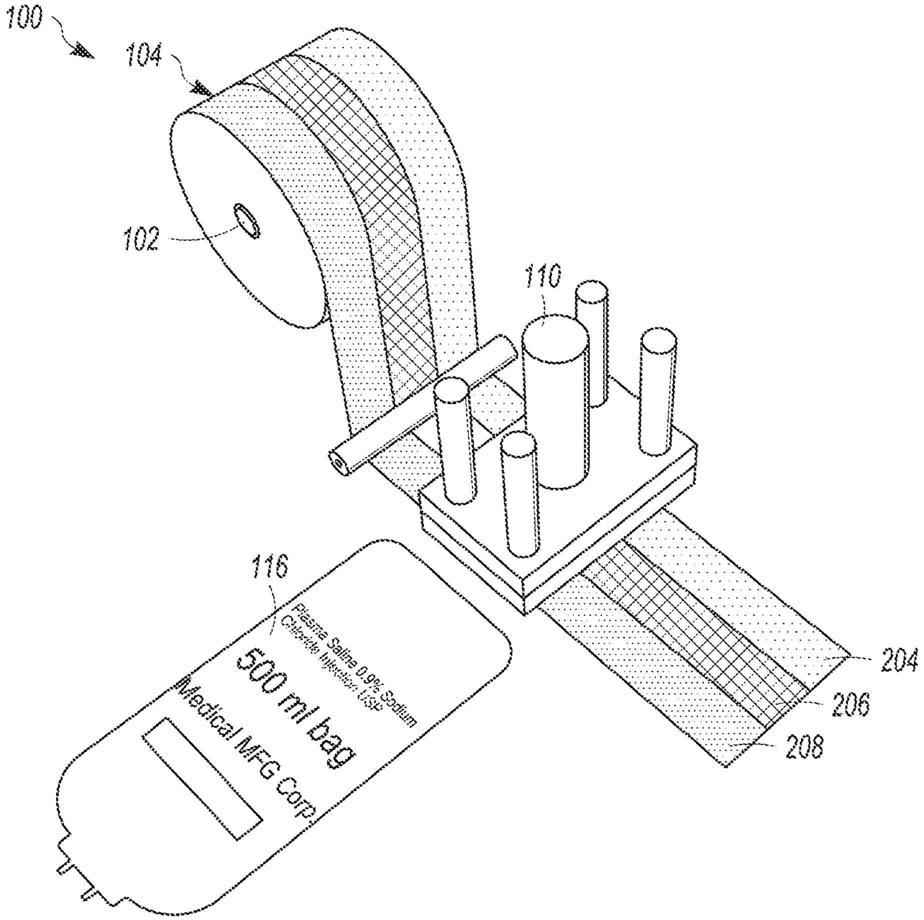
FIG. 7 illustrates another example of the hot stamp printing system shown in FIG. 1.

FIG. 7 illustrates another example of the hot stamp printing system 100 shown in FIG. 1. During printing using the multi-layered ribbon 104 having the different colored layers 600, 602 in the hot stamp printing system 100, the upper layer 600 may face the target object 116 such that the upper layer 600 is closer to the target object 116 and the carrier 214 is closer to the heated die 110. The heated die 110 strikes the ribbon 104 and transfers at least some of the inks or pigments from the ribbon 104 to the target object 116 to be printed upon, such as an IV bag. This stamping onto the target object 116 transfers the pigments or inks that are in the ribbon 104 onto the target object 116. This stamping also can transfer multiple layers of different colored inks or pigments onto the target object 116. For example, the ink or pigment in the upper layer 600 can be transferred onto a surface of the target object and the ink or pigment in the underlying layer 602 can be transferred onto the ink or pigment from the upper layer 600. This can result in the ink or pigment transferred to the target object 116 from the upper layer 600 being covered and hidden from view by the ink or pigment transferred to the target object 116 from the underlying layer 602. For example, if the upper layer 600 includes black ink or pigments and the underlying layer 602 includes white ink or pigments, then the stamping of the heated die 110 on the ribbon 104 can transfer the black ink or pigments onto the surface of the target object 116 with the white ink or pigments on top of the black ink or pigments.

Alternatively, the multiple layers 806, 808 can be transferred to the target objects 116 using another printing technique, such as gravure, screen printing, or the like.

Figure 8:
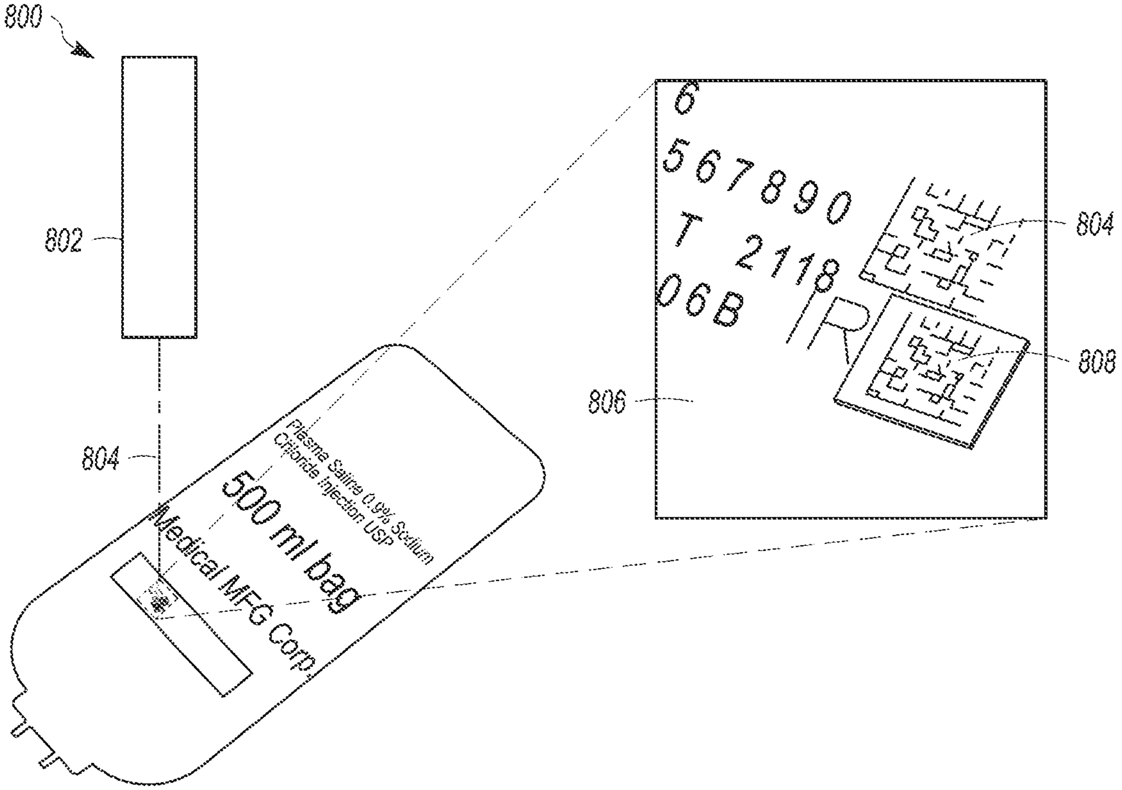
FIG. 8 illustrates one example of an ablation assembly.

FIG. 8 illustrates one example of an ablation assembly 800. The ablation assembly 800 includes an energy source 802 that directs energy 804 toward the target object 116 to remove one or more upper or exposed layers 806 (or portions of layers 806) of ink or pigments on the target object. For example, the energy source 802 can be a laser light source that emits a laser light toward the target object 116 that removes one or more portions of the ink or pigments stamped onto the target object 116 in an upper or exposed layer 806 to reveal the underlying ink or pigments on the target object 116 in an underlying layer 808. The upper or exposed layer 806 of ink or pigments can be transferred onto the target object 116 from the lower layer 602 in the ribbon 104 while the lower or covered layer 808 of ink or pigments can be transferred onto the target object 116 from the upper layer 600 in the ribbon 104.

For example, the ribbon 104 can be used to transfer the ink or pigment in the upper layer 600 shown in FIG. 6 onto a surface of the target object 106 and transfer the ink or pigment in the lower layer 602 shown in FIG. 6 on top of the ink or pigment on the target object 116 that was transferred from the upper layer 600. The energy emitted by the energy source 802 can ablate or otherwise remove portions of the ink or pigment from the lower layer 602 (the visible ink or pigment on the target object 116) to reveal the underlying ink or pigment from the upper layer 600 (which was previously not visible).

The ablation assembly 800 can be used to form variable data on the target object 116 using the layers 600, 602 of inks or pigments transferred to the target object 116. The hot stamp printing system 100 can transfer invariable information or data onto the target objects 116 and the ablation assembly 800 can remove part of the transferred inks or pigments to form variable information or data on the target object. For example, the same indicia (e.g., images, text, numbers, etc.) may be transferred onto several of the target objects 116 using the ribbon 104 with the layers 600, 602 of ink or pigments in the ribbon 104. This common indicia that is printed on several target objects 116 may be invariable data as the indicia does not change for multiple target objects 116. The ablation assembly 800 can then remove different portions of the ink or pigments transferred onto the target objects 116 from the lower layer 602. The portions of the ink or pigments that are removed can be different for each of two or more of the target objects 116 to reveal different portions of the underlying ink or pigments on the target objects 116. The different revealed portions of the underlying ink or pigments can be variable data as the different revealed portions for different target objects 116 form different indicia. For example, the different revealed portions can be unique identifiers, bar codes, serial numbers, or the like, of the target objects 116.

Figure 9:
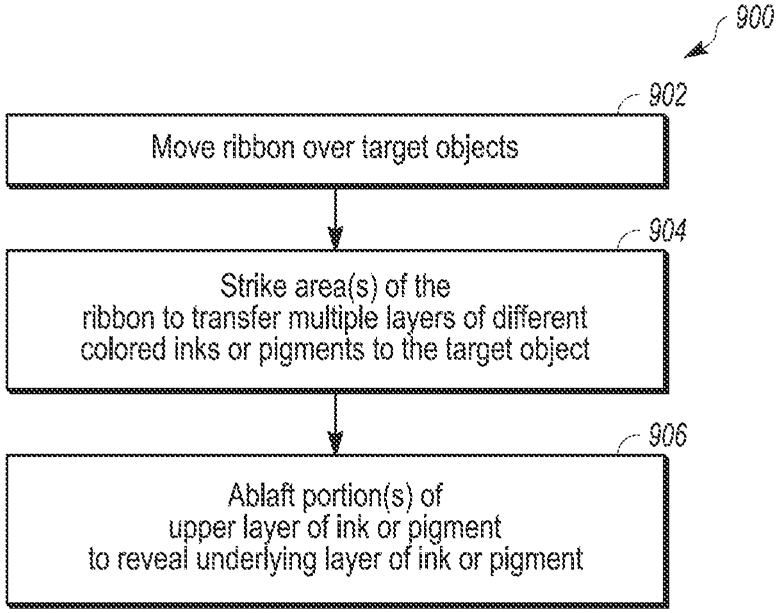
FIG. 9 illustrates a flowchart of one example of a method for hot stamp printing.

FIG. 9 illustrates a flowchart of one example of a method 900 for hot stamp printing. The method 900 can represent operations performed by the system 100 and the assembly 800 (which may be included in the system 100 or separate from the system 100). At 902, a multi-color ribbon is moved over one or more target objects. The ribbon can include overlapping layers of different colored inks or pigments, as described above. While one embodiment of the ribbon includes two layers of pigments or inks, alternatively, the ribbon may have three or more layers of overlapping or overlaying pigments or inks.

At 904, the ribbon is stricken by a die. This action transfers two or more layers of different colors of inks or pigments from the ribbon onto the target object. At 906, an upper layer of these different colored inks or pigments is at least partially removed by ablating the upper layer of inks or pigments transferred from the ribbon at 904. This can reveal an underlying layer of a differently colored ink or pigment. The ablating can be individualized for the target objects by forming variable data or variable indicia, as described above.

In one embodiment, a method includes moving a multi-color ribbon over a target object. The multi-color ribbon has a lower layer and an upper layer of inks or pigments. The method also includes applying heat and pressure onto the multi-color ribbon to transfer the overlying layers of the inks or pigments to the target object, and removing at least a portion of the lower layer of the ink or pigment that was transferred to the target object to reveal at least a portion of the upper layer of the ink or pigment that were transferred to the target object.

Optionally, the lower layer and the upper layer of the inks or pigments are different colored inks or pigments.

Optionally, the lower layer of the ink or pigment in the multi-color ribbon is transferred to the target object as an upper layer and the upper layer of the ink or pigment in the multi-color ribbon is transferred to the target object as a lower layer.

Optionally, the at least the portion of the lower layer of the color inks or pigments is removed to form variable data on the target object.

Optionally, the at least the portion of the lower layer of the color inks or pigments is removed using laser ablation.

In one embodiment, a multi-color ribbon configured for use in a hot stamp printing system is provided. The ribbon includes an elongated carrier that continuously extends from a first end to an opposite end, and multiple, differently colored inks or pigments disposed in different layers of the elongated carrier between the first end and the second end of the elongated carrier. The elongated carrier is configured to be moved across a target object with heat and pressure applied to the elongated carrier to transfer two or more of the differently layers of the differently colored inks or pigments to the target object for hot stamp printing of the two or more layers of the differently colored inks to the target object.

In one embodiment, a hot stamp printing system includes a heated die configured to strike a multi-colored ribbon having overlying layers of different color inks or pigments to transfer the layers of the different color inks or pigments to a target object, and an ablation assembly configured to generate an ablation energy toward the layers of the different color inks or pigments on the target object, remove at least a portion of an upper layer of the layers of the different color inks or pigments on the target object, and reveal an underlying layer of the layers of the different color inks or pigments on the target object.

Optionally, the heated die is configured to strike the multi-colored ribbon such that the lower layer of the ink or pigment in the multi-color ribbon is transferred to the target object as an upper layer and the upper layer of the ink or pigment in the multi-color ribbon is transferred to the target object as a lower layer.

Optionally, the ablation assembly is configured to remove the at least the portion of the lower layer of the inks or pigments to form variable data on the target object.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A multi-color, hot stamp printing method comprising:

moving a multi-color ribbon over a target object in a single pass over the target object, the ribbon having different non-overlapping areas with each of the areas containing an ink or pigment of a different color than the other ones of the areas, each of the areas extending end-to-end along a length of the ribbon; and striking two or more of the different areas in the ribbon with a die while the ribbon is moved over the target object in the single pass, wherein the die strikes the two or more of the different areas to simultaneously transfer differently colored inks or pigments in the two or more of the different areas to the target object at the same time.

2. The multi-color, hot stamp printing method of claim 1, wherein at least one of the areas of the ribbon includes lower and upper layers of the inks or the pigments, and striking the at least one of the areas of the ribbon with the die transfers the lower and upper layers to the target object, and further comprising:

removing at least a portion of the lower layer of the inks or the pigments that were transferred to the target object to reveal at least a portion of the upper layer of the inks or the pigments that were transferred to the target object.

3. The multi-color, hot stamp printing method of claim 2, wherein the ribbon moves over the target object in a web direction that extends end-to-end along the length of the ribbon, and striking the ribbon with the die that is heated includes moving the die downward in a transfer direction to the ribbon.

4. The multi-color, hot stamp printing method of claim 3, wherein striking the ribbon with the die that is heated uses heat and pressure to transfer the inks or the pigments to the target object.

5. The multi-color, hot stamp printing method of claim 4, wherein striking the ribbon with the die transfers the inks or the pigments to an intravenous bag as the target object.

6. The multi-color, hot stamp printing method of claim 1, wherein the ribbon includes two of the areas and striking the ribbon with the die includes striking both of the areas with the die.

7. The multi-color, hot stamp printing method of claim 1, wherein the ribbon includes three or more of the areas and striking the ribbon with the die includes striking at least two of the three or more areas with the die.

8. The multi-color, hot stamp printing method of claim 1, wherein striking the ribbon with the die transfers the inks or the pigments in a first area of the areas in the ribbon to a second area of the target object and transfers the inks or the pigments in a different, third area of the areas in the ribbon to a fourth area of the target object, but cannot transfer the inks or the pigments in the first area of the ribbon to the fourth area of the target object and cannot transfer the inks or the pigments in the third area of the ribbon to the fourth area of the target object.

9. The multi-color, hot stamp printing method of claim 8, wherein the second area and the fourth area of the target object do not overlap each other.

10. The multi-color, hot stamp printing method of claim 9, wherein striking the ribbon with the die cannot transfer the inks or the pigments in the first area of the ribbon to the fourth area of the target object and cannot transfer the inks or the pigments in the third area of the ribbon to the fourth area of the target object because moving the ribbon over the target object only moves the first area of the ribbon over the second area of the target object, only moves the third area of the ribbon over the fourth area of the target object, does not move the first area of the ribbon over the fourth area of the target object, and does not move the third area of the ribbon over the second area of the target object.

11. The multi-color, hot stamp printing method of claim 1, wherein striking the ribbon with the die includes overprinting a same location on the target object with the inks or the pigments in the two or more areas of the ribbon by repeatedly striking the two or more areas of the ribbon with the tie to contact the same location on the target object.

12. The multi-color, hot stamp printing method of claim 11, wherein striking the ribbon with the die to overprint the same location on the target object changes a shading of the inks or the pigments that are transferred to the target object.

13. The multi-color, hot stamp printing method of claim 1, wherein the die is a first die that prints first information onto the target object by striking the two or more areas of the ribbon, and further comprising:

changing the first die to a second die to strike the ribbon; and striking the ribbon with the second die to print second information onto the target object with the second information being different from the first information.

14. The multi-color, hot stamp printing method of claim 1, wherein the multi-color ribbon is moved in a web direction extending end-to-end along the length of the ribbon while the two or more of the different areas in the ribbon are struck by the die.

15. A hot stamp printing method comprising:

moving a multi-color ribbon over a target object, the ribbon having an elongated carrier that continuously extends from a first end to an opposite end, the ribbon having different non-overlapping areas that each extend from the first end of the ribbon to the opposite end of the ribbon, the areas in the ribbon having differently colored inks or pigments on the elongated carrier; and striking two or more of the areas in the ribbon with a die from a hot stamp printing system during a single pass of the ribbon over the target object to simultaneously transfer two or more of the differently colored inks or pigments to the target object at the same time.

16. The multi-color, hot stamp printing method of claim 15, wherein at least one of the areas of the ribbon includes lower and upper layers of the inks or the pigments, and striking the at least one of the areas of the ribbon with the due-die transfers the lower and upper layers to the target object, and further comprising:

removing at least a portion of the lower layer of the inks or the pigments that were transferred to the target object to reveal at least a portion of the upper layer of the inks or the pigments that were transferred to the target object.

17. The multi-color, hot stamp printing method of claim 15, wherein the ribbon includes three or more of the areas and striking the ribbon with the die includes striking at least two of the three or more areas with the die.

18. The multi-color, hot stamp printing method of claim 15, wherein striking the ribbon with the die transfers the inks or the pigments in a first area of the areas in the ribbon to a second area of the target object and transfers the inks or the pigments in a different, third area of the areas in the ribbon to a fourth area of the target object that does not overlap the second area of the target object, but cannot transfer the inks or the pigments in the first area of the ribbon to the fourth area of the target object and cannot transfer the inks or the pigments in the third area of the ribbon to the fourth area of the target object.

19. The multi-color, hot stamp printing method of claim 18, wherein striking the ribbon with the die cannot transfer the inks or the pigments in the first area of the ribbon to the fourth area of the target object and cannot transfer the inks or the pigments in the third area of the ribbon to the fourth area of the target object because moving the ribbon over the target object only moves the first area of the ribbon over the second area of the target object, only moves the third area of the ribbon over the fourth area of the target object, does not move the first area of the ribbon over the fourth area of the target object, and does not move the third area of the ribbon over the second area of the target object.

20. The multi-color, hot stamp printing method of claim 15, wherein striking the ribbon with the die includes overprinting a same location on the target object with the inks or the pigments in the two or more areas of the ribbon by repeatedly striking the two or more areas of the ribbon with the tie to contact the same location on the target object and to change a shading of the inks or the pigments that are transferred to the target object.

21. The multi-color, hot stamp printing method of claim 15, wherein the die is a first die that prints first information onto the target object by striking the two or more areas of the ribbon, and further comprising:

changing the first die to a second die to strike the ribbon; and striking the ribbon with the second die to print second information onto the target object with the second information being different from the first information.

22. The hot stamp printing method of claim 15, wherein the multi-color ribbon is moved over the target object in a web direction that extends from the first end to the opposite end of the elongated carrier while the two or more of the areas in the ribbon are struck by the die.

* * * * *